(12) United States Patent
Imae et al.

(10) Patent No.: US 9,984,794 B1
(45) Date of Patent: May 29, 2018

(54) REFRACTORY INSULATING SHEET

(71) Applicant: IMAE INDUSTRY CO., Ltd., Osaka (JP)

(72) Inventors: Kenji Imae, Osaka (JP); Yoshihiko Imae, Osaka (JP); Takashi Shirai, Osaka (JP); Naoyuki Oya, Osaka (JP); Kimihiko Sugiura, Osaka (JP)

(73) Assignee: IMAE INDUSTRY CO., LTD., Osaka (JP)

( * ) Notice: Subject to any disclaimer, the term of this patent is extended or adjusted under 35 U.S.C. 154(b) by 0 days. days.

(21) Appl. No.: 15/823,956

(22) Filed: Nov. 28, 2017

(51) Int. Cl.
| | | |
|---|---|---|
| H01B 7/29 | (2006.01) | |
| H01B 3/12 | (2006.01) | |
| B32B 17/02 | (2006.01) | |
| B32B 18/00 | (2006.01) | |
| B32B 33/00 | (2006.01) | |

(52) U.S. Cl.
CPC ............... *H01B 7/29* (2013.01); *H01B 3/12* (2013.01); *B32B 17/02* (2013.01); *B32B 18/00* (2013.01); *B32B 33/00* (2013.01); *B32B 2305/188* (2013.01); *B32B 2307/3065* (2013.01); *B32B 2313/04* (2013.01); *B32B 2315/02* (2013.01); *B32B 2315/085* (2013.01); *B32B 2457/04* (2013.01)

(58) Field of Classification Search
CPC .. H01B 7/29; H01B 3/12; B32B 17/02; B32B 18/00; B32B 33/00; B32B 2307/3065; B32B 2315/085; B32B 2315/02; B32B 2315/04; B32B 2457/04; B32B 2305/188
See application file for complete search history.

(56) References Cited

FOREIGN PATENT DOCUMENTS

| | | |
|---|---|---|
| JP | 2000-192570 | 7/2000 |
| JP | 2002-95119 | 3/2002 |
| JP | 2006-527152 | 11/2006 |
| JP | 2016-148347 | 8/2016 |
| WO | 2004/110951 | 12/2004 |
| WO | 2011/060259 | 5/2011 |
| WO | 2013/053566 | 8/2013 |
| WO | 2015/107566 | 7/2015 |

*Primary Examiner* — Michael C Miggins
(74) *Attorney, Agent, or Firm* — Greenblum & Bernstein, P.L.C.

(57) ABSTRACT

A thin and lightweight refractory insulating sheet comprising a refractory bag and a layered type thermal insulator in the bag is disclosed. The layered type thermal insulator comprises a thermal energy consumption layer, a reflector and a graphite layer, and can efficiently attenuate thermal energy by conducting the thermal energy in all directions of the plane even when locally heated, and utilizing the thermal energy for vaporization of the water generated from the thermal energy consumption layer.

14 Claims, 5 Drawing Sheets

11 Layers

17 Layers

REFRACTORY INSULATING SHEET

BACKGROUND OF THE INVENTION

Field of the Invention

The present invention relates to a refractory insulating sheet capable of compactly housing communication cables, electric transmission cables and the like for the purpose of protecting them against fire or flame, as well as capable of delaying the time reaching a high temperature that damages cable, especially cable sheathing.

Description of the Related Art

Along with the development of information technology in recent years, protecting optical fibers, communication cables, electric transmission cable and so on against sudden disasters such as fire are required.

If the sheathing of the cable burns, a short circuit occurs between the cables, communication control system and electric power supply would not work, and therefore fire retarding that avoids spreading fire over these communication cable networks is particularly required.

Furthermore, in power plants such as nuclear power plants, protecting communication cables, electric transmission cables, etc. from unexpected fire or the like is very important.

As the fire retarding strategy in recent years, housing a bundle of cables with incombustible or flame-retardant refractory insulating sheet, or hindering spread of fire by watering and/or filing with digestion gas has been adopted. Fire retarding method with use of refractory insulating sheets is advantageous as a protection measure for cables multilevel wiring network from fire because this measure can be adopted even in a narrow space or corner site having bending portion.

The refractory insulating sheet used for fire retarding method as described above should be superior in heat insulating performance as well as lightweight and flexible so that the cable can be housed compactly because there is not sufficient extra space around the rack for cables. The refractory insulating sheet should be also excellent in handling. A common refractory insulating sheets is formed by housing fire resistant felt made from ceramic fibers by needle punching or the like, soft type blanket made of refractory ceramic fiber with a thickness of 10 to 20 mm, or a pile of these covered with a heat-resistant woven fabrics.

For example, Japanese Unexamined Patent Application Publication No. 2002-95119 (Patent Document 1) discloses a thin refractory insulating sheet for protecting a cable easily to cover a bundle of cables, which is a sheet formed by compression of fibrous fireproof material such as a ceramic fiber, alumina fiber or the like. Such a refractory insulating sheet is enclosed in a refractory fabric bag to prevent leaking out of dust or powder derived from the fibrous fireproof material.

Besides the refractory insulating sheet made of ceramic fiber, an expansion type refractory sheet is suggested in for example, Japanese Unexamined Patent Application Publication No. 2000-192570 (Patent Document 2). The expansion type refractory sheet can form a carbonized insulating layer having pores by generating incombustible gas with an elevation of temperature and carbonizing itself when exposing fire.

On the other hand, a fire barrier or the like is also suggested in for example, Japanese Unexamined Patent Application Publication No. 2006-527152 (Patent Document 3). The fire barrier is a refractory panel obtained by combining and stacking materials appropriately chosen from expanded material (e.g. expanded graphite sheet), reflector (e.g. foil or plate of highly reflective metal such as aluminum, nickel, or chromium), insulating material (e.g. alumina, silicic acid compound, and the like ceramic materials), and corrugated layer having a confining gas region, with an alkali silicate resin composition layer.

By the way, a facility such as a nuclear power plant equipped with important equipment including a communication cable is seriously affected by the damage of cables due to fire. The damage is possible to bring a very serious accident. For this reason, severe fire retarding method sufficient for maintaining cables below the heat resistant temperature of the sheath of the cable, for example below 200° C., is required. This requirement for the fire retarding method is necessary one for the cables not to burn under the exposure to fire for 1 hour.

In general, the heat insulating performance of thermal insulator is proportional to its thickness as a parameter, therefore in order to satisfy the above fire resistance solely by the thermal insulator, the thickness of 50 mm or more is needed in the case that the thermal insulator is a fire resistant sheet mainly composed of a ceramic fiber or a glass fiber. However, since the flexibility of the thermal insulator decreases in proportion to the thickness of the sheet, applying a refractory insulating sheet having a thickness of 50 mm or more at the corner where the refractory insulating sheet must be bent, is inappropriate.

Furthermore, in the case of a complex wiring network where cables are multilevel wired and sprinklers are installed, the refractory insulating sheet is required to be thin sufficient for being applicable even in a space of 50 mm or less.

Accordingly, the refractory insulating sheet covering the bundle of cables is required to have flexibility, light weight, and thin shape while satisfying the above heat insulating performance.

SUMMARY OF THE INVENTION

The present invention has been made in view of the above circumstances, and it is an object of the invention to provide a thin, lightweight, and flexible refractory insulating sheet made of safety material complying with the regulation of the Ordinance on Industrial Safety and Health. The refractory insulating sheet can impart a necessary fire resistance by housing cables wiring communication network laid even in restricted narrow space.

The refractory insulating sheet of the present invention is a refractory insulating sheet comprising a layered type thermal insulator and a bag housing the layered type thermal insulator. The layered type thermal insulator comprises at least one thermal energy consumption layer (F) composed of a nonwoven fabric of silica-based inorganic fibers having a hydroxyl group; at least one reflector (R) which is a metal foil or a metal layer-attached substrate in which a metal layer overlays a substrate; and at least one graphite layer (G) in which graphite crystals are oriented in a planar direction.

The layered type thermal insulator optionally may further comprise at least one aerogel-carrying sheet (A) in which silica aerogel having a porosity of 70% or more is carried by a sheet-like fiber agglomerate.

According to another aspect of the invention, the layered type thermal insulator comprises at least one thermal energy consumption layer (F) composed of a nonwoven fabric of silica-based inorganic fibers having a hydroxyl group; and at least one reflector (R) which is an aluminum foil or an aluminum layer-attached substrate in which a metal layer overlays a substrate, or a combination of the aluminum foil and the aluminum layer-attached substrate.

DETAILED DESCRIPTION OF THE INVENTION

Figure 1:
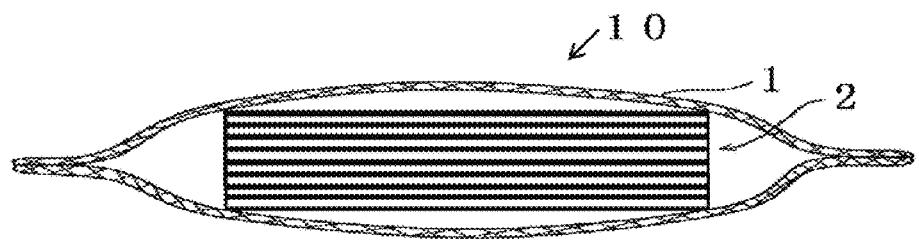
FIG. 1 is a schematic cross-sectional view showing a configuration of a refractory insulating sheet according to an embodiment of the invention.

FIG. 1 is a schematic cross-sectional view showing a configuration of a refractory insulating sheet 10 as a representative embodiment of the invention. The refractory insulating sheet 10 comprises a bag 1 shaped from a woven fabric of refractory fiber and a layered type thermal insulator 2 accommodated in the bag.

Hereinafter, the bag and the layered type thermal insulator will be described in detail.
<Layered Type Thermal Insulator>
[Constituent Elements of Thermal Insulator]
First, each layer constituting the layered type thermal insulator which is the main body of the refractory insulating sheet of the invention will be described.
(1) The Thermal Energy Consumption Layer (F)

The thermal energy consumption layer is composed of a nonwoven fabric made of silica-based inorganic fibers having hydroxyl groups, which can exert thermal insulation effect by consuming thermal energy by itself.

The silica-based inorganic fiber having a hydroxyl group used in the invention is a silica-based inorganic fiber having 81% by weight or more of $SiO_2$ and existing Si (OH) as a part of the network made of SiO—. The silica-based inorganic fiber can generate $H_2O$ by dehydration condensation reaction shown below formula.

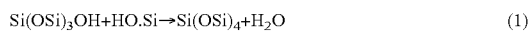

$$Si(OSi)_3OH+HO.Si \rightarrow Si(OSi)_4+H_2O \quad (1)$$

The composition of the silica-based inorganic fiber is not particularly limited, but preferably has the following composition:
81 to 97% by weight of $SiO_2$;
3 to 19% by weight of $Al_2O_3$; and
2% by weight or less of a component (referred to as "other component") selected from the group consisting of $ZrO_2$, $TiO_2$, $Na_2O$, $Li_2O$, $K_2O$, CaO, MgO, SrO, BaO, $Y_2O_3$, $La_2O_3$, $Fe_2O_3$, and mixtures thereof.

The silica-based inorganic fiber may be produced by the following method, but not limited thereto. The method comprises
melting a starting glass material having the following composition
55 to 80% by weight of $SiO_2$,
5 to 19% by weight of $Al_2O_3$,
15 to 26% by weight of $Na_2O$,
0 to 12% by weight of $ZrO_2$,
0 to 12% by weight $TiO_2$, and
1.5% by weight or less of $Li_2O$, $K_2O$, CaO, MgO, SrO, BaO, $Y_2O_3$, $La_2O_3$, $Fe_2O_3$ and mixtures thereof;
forming filaments or staple fibers from the melt;
acid extracting the obtained filament or staple fiber; and
removing residual acid and/or salt residue from the extracted filament or staple fiber, and being followed by drying.

In the treatment with acid, alkali metal ions are replaced with protons, but ions ($Al^{3+}$, $TiO^{2+}$ or $Ti^{4+}$, and $ZrO^{2+}$ or $Zr^{4+}$) can still remain in the Si—O network. Metal ions substituted with protons in the silicon dioxide skeleton seems to have a certain number of hydroxyl groups depending on valence. These hydroxyl groups undergo condensation reaction at about 600 to 800° C. as in the above formula (1) to form new Si—O—Si bonds and release $H_2O$.

The water generated by the dehydration condensation is vaporized due to high-temperature in atmosphere, and thermal energy given to the silica-based inorganic fiber of nonwoven fabric is utilized for this vaporization. Thus the nonwoven fabric can be suppressed in temperature rise.

The silica-based inorganic fiber usually contains Si(OH), typically $AlO_{1.5} \cdot 18[(SiO_2)_{0.6}(SiO_{1.5}OH)_{0.4}]$, but not limited thereto.

The silica-based inorganic fiber may be produced as a staple fiber or a filament by melt spinning. The staple fiber has a diameter of 6 to 13 μm, preferably about 7 to 10 μm and a length of 3 to 30 mm. The filament has a diameter of 6 to 13 μm, preferably about 7 to 10 μm and a length of 30 to 150 mm. Both of filament and staple fiber are substantially free from shots because they are manufactured by continuous spinning after melting. For this reason, the silica-based inorganic fiber comply the safety standards of the Ordinance on Industrial Safety and Health and therefore it is not regulated by the specific chemical substance prevention rules.

Commercially available silica-based inorganic fibers may be used. For example, BELCOTEX® of BelChem Fiber Materials GmbH may be used.

BELCOTEX® fibers are generally made from silicic acid modified with alumina and its standard type pre-yarn of the staple fiber has an average fineness of about 550 tex. The BELCOTEX® fiber is amorphous and generally contains about 94.5 wt % of silica, about 4.5 wt % of alumina, less than 0.5 wt % of oxide, and less than 0.5 wt % of other components. The average diameter of the pre-yarn is about 9 μm and little variation. The BELCOTEX® fibers has a melting point of 1500° C. to 1550° C. and therefore can be durable up to 1100° C.

A nonwoven fabric using such silica-based inorganic fibers can be manufactured by entangling fibers of the web formed by wet or dry method by a conventionally known method such as a hydroentangling, a needle punching, or the like.

Thickness of the thermal energy consumption layer constituted by the above-mentioned nonwoven fabric of silica-based inorganic fiber is not particularly limited, but is preferably 3 to 10 mm, more preferably 5 to 7 mm. Unduly thin thermal energy consumption layer cannot consume much thermal energy due to the insufficient fiber amount, and consequently sufficient heat insulating performance cannot be expected. On the other hand, unduly thick thermal energy consumption layer causes to decrease the number of the layers incorporated in the layered structure due to the relationship with the overall thickness of a resulting layered structure, which could not provide an expected effect of the invention.

The nonwoven fabric of the silica-based inorganic fiber may be used alone as the thermal energy consumption layer (F), or may be sandwiched by reflectors (R) to form a layered unit of "R/F/R".

In such layered unit, water generated in dehydration condensation reaction may be vaporized without diffusing to other layers, which may assure the effective consumption of thermal energy in the nonwoven fabrics.

(2) Reflector (R)

The reflector has a role of reflecting thermal energy. A metal foil as well as a substrate which is overlayed with metal layer (hereinafter referred to as "metal layer-attached substrate") may be employed for the reflector. The metal layer of the metal layer-attached substrate is composed of metal foil or metal deposited on the substrate.

Examples of the metal used for the metal layer include highly reflective metals such as aluminum, stainless steel, titanium, chromium, nickel, gold and the like, preferably aluminum.

A metal foil of the highly reflective metal, preferably an aluminum foil has a thickness of usually 5 to 25 µm, preferably 10 to 18 µm. Unduly thick metal foil tends to be rigid, which causes to reduce the flexibility of the finally formed refractory insulating sheet, resulting in insufficient handling properties of the refractory insulating sheet.

A plastic film or cloth may be used as the substrate for the above-mentioned metal layer-attached substrate.

As the plastic film, a polyolefin film such as polyethylene or polypropylene, a polyester film, a polycarbonate film, a polyamide film or the like may be used, and preferably a polyethylene terephthalate (PET) film having high heat resistant temperature. Although the thickness of the plastic film to be used is not particularly limited, it is usually 8 µm to 500 µm, preferably 8 to 300 µm, and more preferably 10 to 100 µm. Unduly thin substrate could not function as a substrate. Unduly thick substrate leads to increase the thickness of the layered type thermal insulator, and hinder not only thinning of the refractory insulating sheet but also securing necessary heat insulating performance.

A woven fabric or a knitted fabric is preferably used as the cloth from the viewpoint of the demand for a thin shape. As the filament or fiber used for the fabric, natural fibers or semisynthetic fibers such as rayon fibers, synthetic fibers such as aramid fibers or polyester fibers, metal fibers, ceramic fibers, mineral fibers, glass fibers, carbon fibers, etc. may be used. Of these, glass fiber, silica fiber, ceramic fiber and mineral fiber are preferable, glass fiber is more preferable from the viewpoint of heat resistance and cost reduction. Although depending on the composition, the heat resistance of glass fiber made of a general-purpose type E glass (50 to 60% in terms of $SiO_2$, 10 to 15% of $Al_2O_3$) is usually from 600 to 800° C., which is higher than the melting point of aluminum (about 660° C.) which is a favorite metal used for the metal layer.

Therefore, in the case of using a metal layer-attached substrate as the reflector, it is preferable to use a glass fiber woven fabric having a thickness of 50 µm to 2.5 mm, more preferably 0.1 mm to 1 mm as the substrate. On one side or both sides of the substrate a metal is deposited or metal foil is attached.

Besides the above-mentioned single type metal layer-attached substrate where metal is deposited on or metal foil is attached to one surface of a cloth or plastic film, a double type metal layer-attached substrate may be used. The double type metal layer-attached substrate has a structure that metal layers are attached to both sides of a first substrate which is laminated on one side of a second substrate which is woven fabric of glass fiber. Such a double type metal-layer-attached substrate is commercially available as, for example Dual Mirror® (GENTEX Corp.).

Use of a metal foil as a reflector can serve a reflector with little influence on the thickness of the refractory insulating sheet.

On the other hand, use of a metal layer-attached substrate tends to serve a thicker and heavier refractory insulating sheet, as compared with the use of metal foil alone. However, in the case of using a substrate having a melting point higher than that of the metal layer as in the case of using a glass fiber cloth as the substrate, the metal layer is held and the shape of the layered type thermal insulator can also be maintained even under such a condition that the metal foil is burned off, which is advantageous. In addition, a heat insulating effect based on glass fiber cloth can be obtained. Therefore, it can be used as a unit to which a metal foil and a single or double type metal layer-attached substrate are adhered within an allowable range of thickness and weight, alternatively a metal foil and a single or double type metal layer-attached substrate may be employed as a reflector.

The metal foil and the metal layer-attached substrate may be contained alone or in combination thereof as a reflector in a layered type thermal insulator of the invention. For example, two or more metal foils are stacked to form a reflector, a metal foil and a metal layer-attached substrate are appropriately combined to form a reflector.

In the case that the reflector is composed of a plurality of metal foils, a metal layer-attached substrate, or a combination thereof, the kind of the metal constituting the metal foil and/or the metal layer of the metal layer-attached substrate may be the same or different. In the case of using a plurality of metal layer-attached substrates, the kind of the substrate may be chosen from plastic film, fabric, cloth or a combination thereof. For example, two or more metal layer-attached substrates all employing plastic film as substrate, two or more metal layer-attached substrates all employing cloth, or a combination of metal layer-attached substrate employing plastic film and metal layer-attached substrate employing cloth such as woven fabric of glass fiber may be used.

The reflector as described above has a role as a reflector for heat radiation. Therefore, by sandwiching the thermal energy consumption layer (F) with reflectors, the thermal energy can be effectively attenuated based on the function of the thermal energy consumption layer. This means that in a layered type thermal energy consumption layer the nonwoven fabric is enclosed because of being sandwiched by reflectors, therefore thermal energy does not go out but remains in the nonwoven fabric, resulting in the temperature rises in the nonwoven fabric sufficient to initiate the dehydration condensation reaction of the above formula (1). The reflector may suppress the diffusion of the moisture generated by the dehydration condensation reaction, as a result, the moisture can be vaporized due to further rise of temperature of the nonwoven fabric of silica-based inorganic fiber. Thus, the thermal energy transmitted from the heat source is consumed, and therefore not only the thermal insulation effect depending on the thickness of the nonwoven fabric but also the thermal energy attenuation through the vaporization can be obtained. Thus the temperature drop can be achieved.

(3) Graphite Layer (G)

The graphite layer which is an element of the layered type thermal insulator is a graphite sheet having a graphite content of 80 to 100% by weight, preferably 90 to 100% by weight. In the graphite sheet, graphite crystals are oriented in the planar direction.

As the graphite sheet, an expanded graphite sheet obtained by rolling expanding graphite to form into sheet, or a polymer-derived graphite sheet obtained by converting an aromatic polyimide sheet into graphite sheet by heating the aromatic polyimide sheet up to 2500° C. or more in a reduction atmosphere with pressure, may be employed. From the viewpoint of heat resistance, an expanded graphite sheet is preferably used.

Expanded graphite is obtained from graphite powder such as natural scaly graphite, pyrolytic graphite and quiche graphite by treating the graphite powder with an inorganic acid (e.g. sulfuric acid and nitric acid) and strong oxidant (e.g. concentrated nitric acid, perchloric acid, dichromate and hydrogen peroxide) to form a graphite intercalation compound, thereafter washing with water, drying and heating rapidly to 1000° C. or more to gasify the intercalation compound and expand its volume of about several hundred times.

The expanded graphite sheet generally has a thickness of about 10 μm to 3 mm, preferably 50 μm to 1 mm depending on its manufacturing method. The heat resistant temperature is over 1000° C. in the case of heating in a short time. In the case of exposure to heat for long hours, the heat resistant temperature is about 500° C. because the graphite may be oxidized and exhausted. In this expanded graphite sheet the interval between the graphite crystal planes is widened. Thus the expanded graphite sheet is excellent in flexibility and heat resistance.

In addition, the polymer-derived graphite sheet has a thickness of 20 to 100 μm, preferably 25 to 75 μm, and the heat resistant temperature is usually about 400 to 800° C. depending on its starting polymer, manufacturing method and so on.

Such a graphite sheet is excellent in thermal conduction anisotropy. Therefore, when a fire is applied to a part of a fire-resistant heat insulating sheet, thermal energy is spread in entire sheet, resulting in avoiding a local temperature rise to alleviate damage of the layers of the layered type thermal insulator.

Furthermore, when an expanded graphite sheet is used as a graphite layer, a heat insulating effect based on the space between the layers can also be obtained.

In order to effectively obtain the anisotropic effect of the thermal conduction of the graphite sheet, i.e. the temperature rise suppression and the damage mitigation of layers, the graphite sheet is preferably used as a layered unit "reflector/graphite layer/reflector, which is an arrangement that the graphite sheet is sandwiched by reflectors reflecting thermal energy.

When an expanded graphite sheet is used for the graphite layer, stacking a plurality of graphite sheets is preferable because the heat insulating effect is proportional to the number of sheets. The number of the graphite sheets stacked and the arrangement of the graphite sheets are appropriately chosen in accordance with the type of use of the thermal insulating sheet. In the case of stacking a plurality of graphite sheets, they may be stacked directly, or they may be stacked in a separated state by interposing a metal layer, nonwoven fabric of silica-based inorganic fiber or the like between the graphite sheets.

The graphite layer (G) is preferably combined with a thermal energy consumption layer (F) to form a layered unit "G/F", preferably "R/G/F/R". In the layered unit "R/G/F/R", by placing the graphite layer on the side close to the heat source, thermal energy can be conducted throughout the entire surface even when locally heated. This can make the thermal energy conducted all over the nonwoven fabric used as a thermal energy consumption layer. As a result, thermal energy is applied to all over the nonwoven fabric and the dehydration condensation reaction can occur over the entire nonwoven fabric. This could achieve an excellent temperature drop by efficiently consuming thermal energy.

(4) Aerogel-Carrying Sheet (A)

The aerogel-carrying sheet is a sheet in which silica aerogel particles are impregnated in and/or supported on a carrier. The silica aerogel particles each has a porosity of 70% or more, preferably 80% or more.

As the carrier of the silica aerogel, a sheet-like fiber agglomerate such as a paper or board formed by paper-making method with fibers, and sheet-like molded article such as nonwoven fabric, a mat and felt may be used. Examples of the fibers used in the paper-making method include glass fibers; ceramic fibers such as silica fibers, alumina fibers, titania fibers, and silicon carbide fibers; metal fibers; artificial mineral fibers such as rock wool and basalt fibers; carbon fiber, whisker or the like. The sheet-like molded article is produced by shaping fibers with binder into a sheet. The carrier should maintain its shape at the heat resistant temperature (about 750° C.) of the silica aerogel in order to effectively obtain the heat insulating effect from the silica aerogel. For this reason, sheet of artificial mineral fibers, particularly rock wool is preferably used from the viewpoint of cost reduction.

The silica aerogel particles to be supported by the carrier has a diameter of 50 nm to 5 mm, preferably 1 μm to 5 mm, more preferably 1 μm to 500 μm, further preferably 5 μm to 400 μm. The silica aerogel particle has nano-sized pores and the porosity is at least 70% by volume, preferably at least 80% by volume, more preferably at least 90% by volume 90% or more. Thus the aerogel is very light and has a bulk density of about 0.1 to 0.4 g/cm$^3$.

The silica aerogel may be simply impregnated and dispersed in the sheet-like fiber agglomerate as the carrier, or may be supported on fibers of the sheet-like fiber agglomerate with a binder.

The content ratio (weight ratio) of the carrier and the silica aerogel is preferably from 9:1 to 5:5, more preferably from 8:2 to 6:4.

In the case of using a sheet-like rock wool as a carrier, an aerogel-carrying sheet may be obtained by molding a mixture of rock wool and desilvered aerogel (especially silica aerogel) as a main raw material with a binder into a sheet shape.

Such an aerogel-carrying sheet usually has a thermal conductivity of 0.028 W/mK or less, preferably from 0.013 W/mK to 0.025 W/mK.

The aerogel-carrying sheet has a thickness of usually 2 to 20 mm, preferably 3 to 15 mm, more preferably 3 to 5 mm. From the viewpoints of light weight, thin shape and flexibility, the thinner, the better. However, unduly thin carrier lessens the amount of aerogel carried, which makes difficult to obtain sufficient heat insulating performance.

Since the aerogel-carrying sheet can provide the heat insulating effect based on pores of the aerogel in addition to pores of the carrier, the aerogel-carrying sheet can exhibit superior heat insulating effect comparing with almost same thick nonwoven fabric or mat without carrying the aerogel. However, since the aerogel-carrying sheet is thicker than the other layers as described above, the number of layers included in the layered structure may be appropriately selected depending on the types of usage, to accomplish the reduction of the thickness of the thermal insulator.

Also, the aerogel-carrying sheet exhibits excellent heat insulating performances due to convection in the pores and its low thermal conductivity. However, the silica aerogel can consume small amount of thermal energy because of its high heat resistance of about 750° C., and exert only small effect of preventing the damage of the layer in the layered type thermal insulator. Accordingly the aerogel-carrying sheet is preferably arranged so as to exist apart from the heat source rather than the thermal energy consumption layer and graphite layer.

(5) Other Layers

Besides the above layers, a cloth such as woven or nonwoven fabric made of glass fiber having high heat resistance, ceramic fiber such as silica fiber and alumina fiber may be contained in the refractory insulating sheet within an allowable range of thickness according to needs.

[Layer Arrangement of Layered Type Thermal Insulator]

Next, the layer arrangement of the layered type thermal insulator will be described.

The layered type thermal insulator, which is a main body of the refractory heat insulating sheet of the invention, can be formed by arranging the thermal energy consumption layer (F), reflector (R: metal foil and/or metal layer-attached substrate), and optionally graphite layer (G) and aerogel-carrying sheet (A). The number of layers stacked and the stacking order are not particularly limited, but it is preferable to arrange these layers in accordance with the following in view of the role of each layer.

The thermal energy consumption layer and the reflector are preferably incorporated as a layered unit.

The reflectors are placed on respective both sides of the thermal energy consumption layers.

The graphite layer is preferably used as a unit "G/F", more preferably as a unit "R/G/F/R".

The graphite layer is preferably placed on the heat source side from the intermediate position in the thickness direction of the layered type thermal insulator.

In the case of containing an aerogel-carrying sheet, it is preferably placed on the side opposite to the heat source, especially on the side farther from the heat source than the graphite layer and thermal energy consumption layer. It is also preferable that at least one thermal energy consumption layer is placed between the graphite layer and the aerogel-carrying sheet.

The metal foil and the metal layer-attached substrate each may be incorporated alone, or they may be combined to be incorporated as a reflector. As for the metal foil, not only single but also a unit of plural metal foils may be incorporated.

The outermost surface of at least one side of the layered type thermal insulator is preferably composed of a reflector. The metal layer as a reflector is capable of reflecting thermal energy and has high thermal conductivity in the planar direction. Therefore the reflector can conduct the thermal energy in the planar direction of the layered type thermal insulator even when heated locally, resulting in avoiding the local damage. If the graphite layer is arranged on the side close to the heat source, the graphite layer would be damaged before sufficiently exerting the thermal diffusion in the planar direction because the graphite layer does not have a function of reflecting thermal energy.

The increase of the number of layers incorporated into the layered type thermal insulator generally enhances the heat insulating performance. However, since the increase in the number of layers lead to thick and heavy, the number of layers incorporated is appropriately selected based on the above, according to the thickness and weight of each layer and the required heat resistance.

From the above viewpoint, a preferable layered unit employed in the layer arrangement include "R/G/F/R", "R/F/R/A", "R/F/R/A/R" and "R/G/F/R/A" wherein the arrangement order is rowed from the heat source side.

Therefore, the thinnest layered unit is "R/G/F/R/A", which may efficiently achieve the temperature drop. In order to achieve more significant temperature drop, the following arrangement may be employed:

the layered unit "R/F/R" may be optionally interposed (e.g. "R/G/F/R/F/R/A");

a plurality of graphite layers may be stacked on the side close to the heat source (e.g. "R/G/G/F/R/A");

a layered unit "R/G/F/R" may be interposed repeatedly (e.g. "R/G/F/R/G/F/R/A");

a plurality of aerogel-carrying sheet may be arranged on the side opposite to the heat source ((e.g. "R/G/F/R/A/R/A"); or the layered unit "R/F/R/A" may be interposed repeatedly (e.g. "R/G/F/R/F/R/A/R/F/R/A").

In addition, the reflector (R) may be composed of only either one of metal foil (M) and metal layer-attached substrate (MD). The unit "M/MD" may be employed for preventing the function deterioration of the reflector due to burn out and keeping the shape of the insulator after metal layer burns, and the unit "M/M" may be employed for adjusting the thickness of the insulator.

The layered type thermal insulator having the above structure is used so that a reflector is placed on the side closest to the heat source. Further, in the relation between the graphite layer and the thermal energy consumption layer, the graphite layer is used so as to be placed on the side close to the heat source. In the case of incorporating the aerogel-carrying sheet into the layered type thermal insulator, the thermal energy consumption layer and the graphite layer are used so as to be placed on the side close to the heat source. As a result, even when the layered type thermal insulator is partially heated by a heat source or the flame, the thermal energy can be conducted on the entire surface of the refractory insulating sheet and thereby suppressing locally heating and burning. Furthermore, after the entire surface is heated through the graphite layer, the nonwoven fabric made of silica-based inorganic fibers, which is an adjacent thermal energy consumption layer, is heated. When the temperature rises due to heating, the silica-based inorganic fiber having a hydroxyl group undergoes a dehydration condensation reaction to generate water. The generated water diffuses in the nonwoven fabric, but further diffusion is hindered by the metal layer constituting the reflector, and the water is vaporized utilizing thermal energy in the nonwoven fabric. Although the temperature of the reflector in contact with the nonwoven fabric rises as the nonwoven fabric is heated, the thermal energy is absorbed by the aerogel (i.e. heat insulating effect of the aerogel) contained in the aerogel-carrying sheet and thereby lowering the temperature on the side opposite to the heat source of the aerogel-carrying sheet.

<Bag>

The layered type thermal insulator having the above structure is housed in a bag of woven fabric made of refractory fibers.

The refractory fiber has a heat resistance up to at least 900° C., preferably at least 1000° C. Specifically, glass fiber having an alumina content of 20% or more, silica fiber, or ceramic fiber is preferably used, and silica fiber is more preferably used. The bag is formed by sewing a woven fabric of the refractory fibers.

The thickness of the woven fabric varies depending on the kind of the fibers constituting the woven fabric. The bag requires heat resistance sufficient for keeping the function as a bag housing the layered type thermal insulator even when heating for 1 hour or longer. From these viewpoint, in the case of woven cloth of silica fiber (silica cloth), the preferable thickness is 0.2 to 1.3 mm. A silica cloth having a thickness of about 0.2 to 1.3 mm has a heat resisting temperature of about 900 to 1100° C.

<Refractory Insulating Sheet>

The refractory insulating sheet 10 shown in FIG. 1 is one in which a layered type thermal insulator 2 is housed in a silica cloth bag 1 and sealed. With such a configuration, the requirement for fixing the stacked state of the layered type thermal insulator 2 can be alleviated. In the case of using an adhesive having a low heat resistant temperature for laminating layers, the adhesive is afraid of carbonization and deterioration due to exposure to high temperature, resulting in breaking the stability of the stacked state. However, the layered type thermal insulator stored in the bag 1 made of a fabric having high heat resistance temperature, the bag can maintain the layered state of the thermal insulator before thermal deterioration such as breakage of the bag 1. This can make possible to integrally handle the refractory insulating sheet having multilayered structure, which is convenient.

A thin layered type thermal insulator can be folded or bent like one-ply heat insulating sheet, and therefore it is versatile enough to be applied on a variety of construction sites necessary for fire-proof. The layered type thermal insulator can wrap a curved surface structure as well as flat plate or a cuboid like a use of thick cloth.

In addition, the layered type thermal insulator may installed with use of a fixture such as rivet, screw, nail, clip, binding band and wire.

Figure 2:
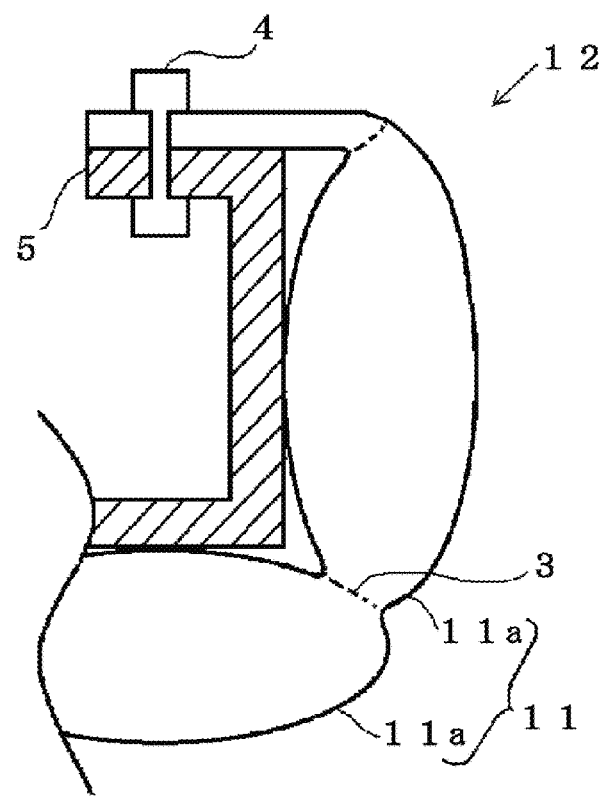
FIG. 2 is a schematic view showing an example of use of a compartment type refractory insulating sheet.

FIG. 2 shows a case where the refractory insulating sheet 12 using the compartment type bag 11 which is composed of plural compartments 11a divided by the split portion 3 is applied to the box 5 housing the cable. Such refractory heat insulating sheet 12 can also enclose an equipment housed in a box 5 having corner portions by fitting the split portion 3 to the corner portion. In this use, the refractory insulating sheet can easily apply to the box without bending the layered type thermal insulator. Such use could reduce the mechanical load on the layered type thermal insulator when applying to the complicated structure.

In FIG. 2, the refractory insulating sheet 12 is fixed to the box 5 with use of rivets 4.

EXAMPLES

This invention will be further illustrated below by means of a number of concrete practical examples, which however do not in any way restrict the scope of the invention.

[Production of Refractory Insulating Sheet]

The following materials were used for production of the refractory insulating sheet.

(1) The Thermal Energy Consumption Layer (F)

As the thermal energy consumption layer (F), a nonwoven fabric having thickness of 5.1 mm and bulk density of 0.15 g/cm$^3$ is used. The nonwoven fabric is made from silica-based fiber, BELCOTEX® (BELCHEM fiber materials GmbH), which has a composition of $AlO_{1.5} \cdot 18[(SiO_2)_{0.6}(SiO_{1.5}OH)_{0.4}]$) and diameter of 9 μm.

(2) Reflector (R)

Aluminum foil (M) or aluminum layer-attached substrate (MD) used as the reflector (R) are described below.

(2-1) Aluminum Foil (M)

An aluminum foil having a thickness of 0.02 mm and a density of 1.95 g/cm$^3$ was used.

(2-2) Al Layer-Attached Substrate (MD)

The following two kinds of Al-deposited fabrics (MD1 and MD2) having a different thickness from each other. The fabrics each was formed from glass fiber and has Al layer on their both sides by vapor-depositing.

MD 1: thickness 0.4 mm and bulk density 1.29 g/cm$^3$
MD 2: thickness 0.1 mm and bulk density 1.40 g/cm$^3$ (3) Graphite Layer (G)

An expanded graphite sheet "Carbide®" (Hitachi Chemical Co., Ltd.) having a thickness of 0.4 mm and a bulk density of 1.02 g/cm$^3$ was used.

(4) Aerogel-Carrying Sheet (A)

Silica aerogel (porosity 90%) and rock wool free from fiber particles were mixed in water at a ratio of rock wool (carrier): silica aerogel=7:3 to obtain an aqueous dispersion of the mixture. A binder and glass fiber were added to the mixture and thereafter carrying out papermaking to produce an aerogel-carrying sheet. The obtained aerogel-carrying sheet comprising of rock wool 57.6 wt %, silica aerogel 24.6 wt %, glass fiber 10 wt %, and binder 4.8 wt %, and had a thickness of 3.8 mm and a bulk density of 0.19 g/cm$^3$.

(5) Bag (SB)

A bag formed from a heat-resistant glass cloth (Unitika Ltd.) having a thickness of 0.8 mm and a bulk density of 0.93 g/cm$^3$ was used. This heat-resistant glass cloth is a woven fabric made from silicate glass fiber having a $SiO_2$ content 96% or more, and therefore can exhibit heat resistance even under the exposure of 945° C. for 1 hour.

[Water Generation in Thermal Energy Consumption Layer]

Figure 3:
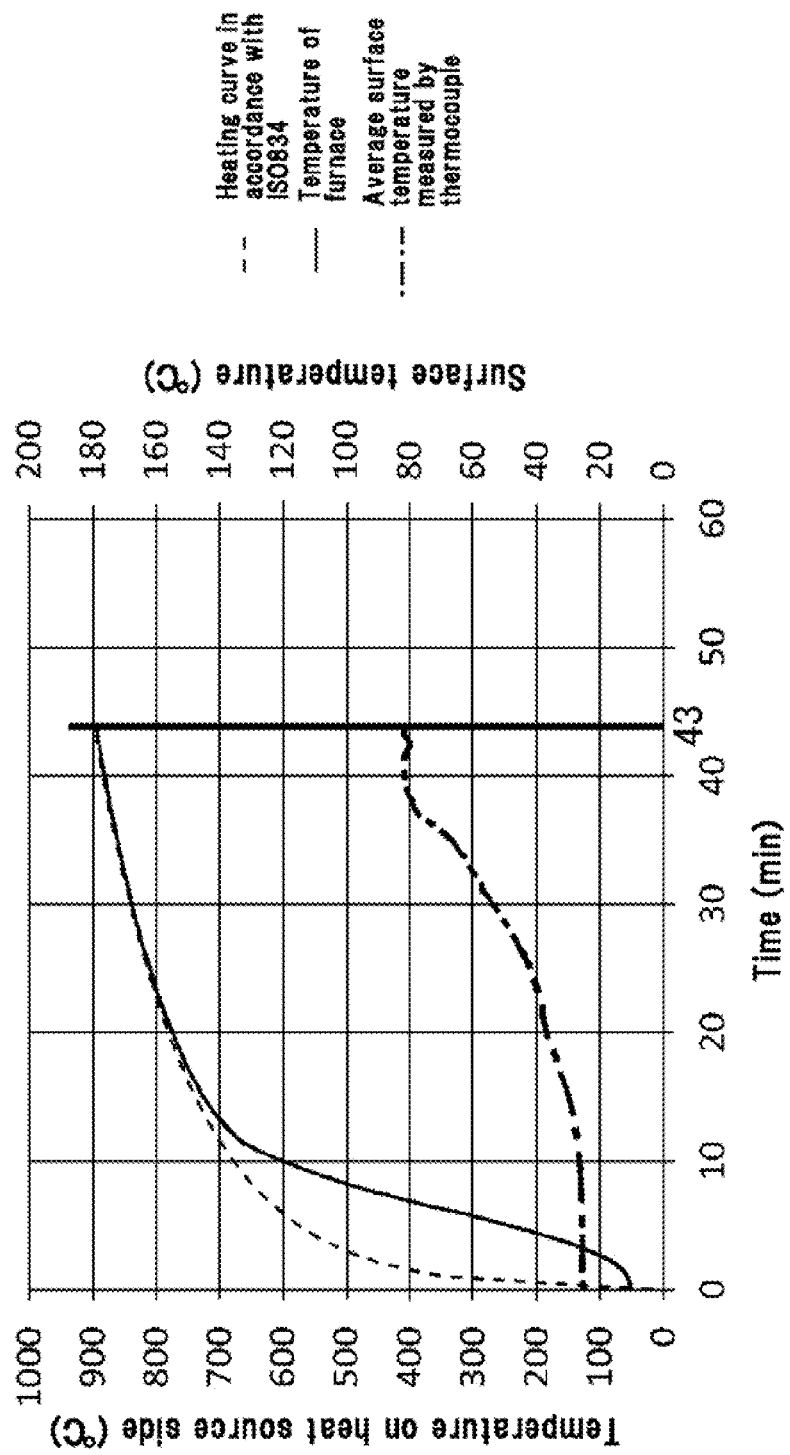
FIG. 3 is a temperature chart showing the results of the refractory insulating sheet prepared in the example for confirming of generation of water in a thermal energy consumption layer.

A layered type thermal insulator having a layer arrangement of $M_1/F_1/M_2/M_3/F_2/M_4/M_5/F_3/M_7/M_8/F_4/M_9/MD$ was housed in a bag and sealed to prepare a refractory insulating sheet. One side of the refractory insulating sheet was heated according to the ISO 834 standard heating curve by bringing one side surface (M1 side) of this refractory insulating sheet into contact with a heating furnace. The refractory insulating sheet was taken out from the heating furnace after heating for 43 minutes. The temperature of the furnace at this time was about 900° C. The heating temperature and the change of the surface temperature of the non-heated side of the refractory insulating sheet, which were measured by a thermocouple, are shown in FIG. 3. The surface temperature on the side opposite to the heat source at 43 minutes after the start of heating was about 80° C.

As for the refractory insulating sheet taken out, the bag was opened, and the layered type thermal insulator was taken out for observation. The silica-based inorganic fiber nonwoven fabric ($F_4$) and the reflectors (aluminum foil $M_9$ and aluminum vapor-deposited woven fabric MD), which were placed farthest from the heat source, were moist and water droplets could be observed.

From this observation, it is supposed that the nonwoven fabric made of silica-based inorganic fiber could suppress the temperature rise by consuming thermal energy for vaporizing water generated through dehydration condensation.

Accordingly, the refractory insulating sheet of the invention may provide a heat insulating effect in proportion to the thickness of the nonwoven fabric as well as a damping effect of thermal energy. These effects could efficiently suppress the temperature rise of the thermal energy consumption layer.

[Evaluation of Refractory Insulating Sheet Nos. 1 to 5]

A layered type thermal insulator having dimensions of 30 cm by 30 cm and having a layer arrangement shown in Table 1 was housed in a bag, sealed to produce refractory insulating sheet Nos. 1 to 5 respectively. The thickness and weight of each refractory insulating sheet are as shown in Table 1.

Figure 4:
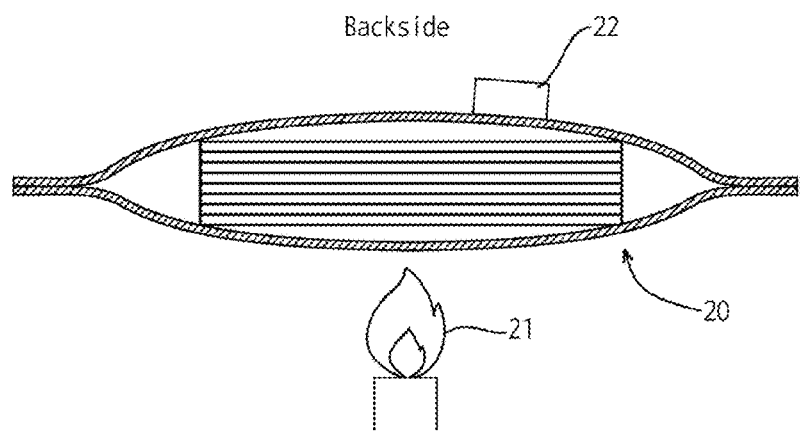
FIG. 4 is a view for explaining a combustion evaluation test conducted in Examples.

Thus prepared refractory insulating sheet Nos. 1 to 5 were subjected to a combustion evaluation test. The combustion evaluation test was carried out as follows:

As shown in FIG. 4, the refractory insulating sheet 20 was placed so that the center portion is heated by the flame 21 and heated for 1 hour. While heating, the temperature of the back surface was monitored with a thermocouple 22 adhered to both sides of the refractory insulating sheet 20. The temperature of the surface opposite to the heat source (referred to as "backside") after one hour of heating is shown in Table 1

After the combustion test, the bag was opened and the state of each layer of the layered type thermal insulator was observed for evaluation. In the case that hole in the sheet, deterioration, or change in shape due to burning was observed in a layer, the layer was judged as a damaged layer. The number of damaged layers was counted and the result are shown in Table 1.

Figure 5:
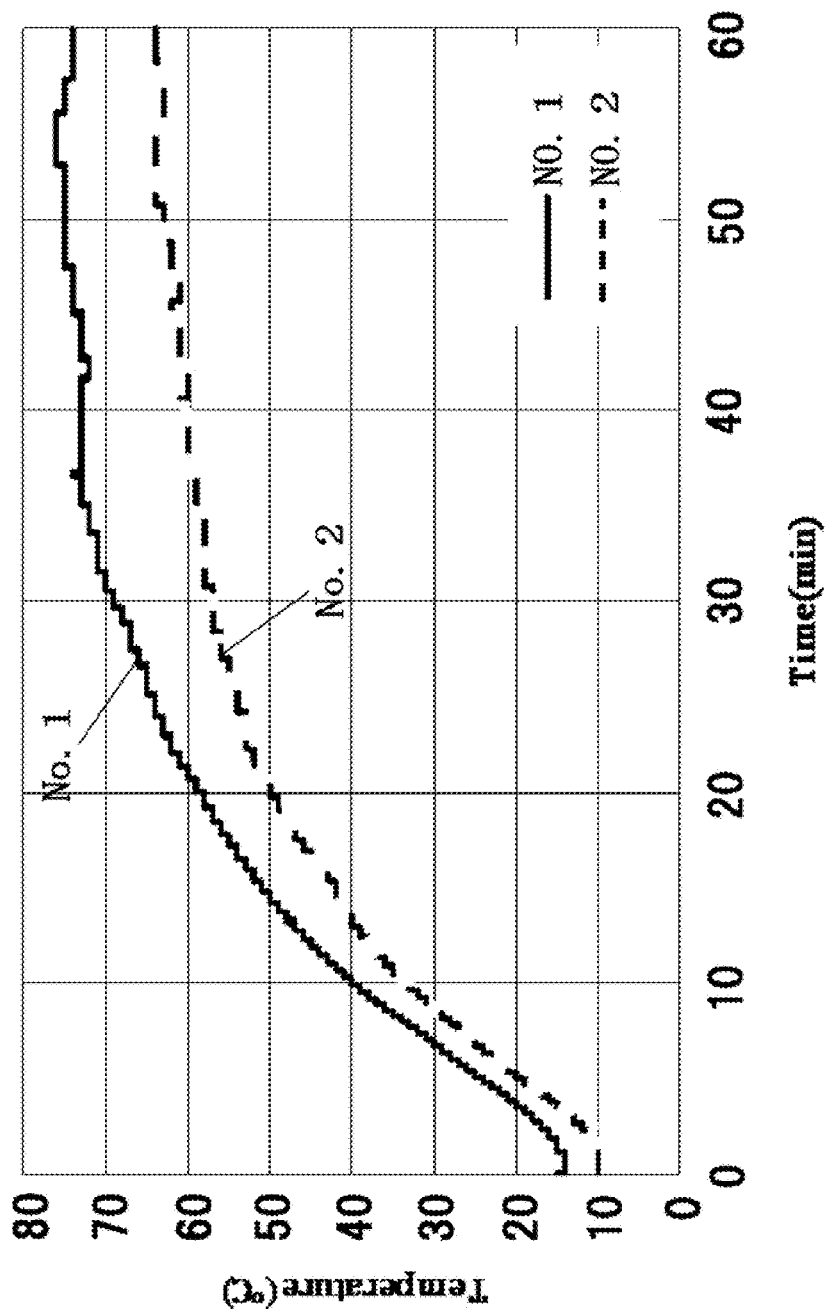
FIG. 5 is a chart showing measurement result of back surface temperatures of refractory insulating sheet Nos. 1 and 2.

The measurement result (graph) of the backside temperature of the refractory insulating sheet Nos. 1 and 2 is shown in FIG. 5.

Figure 6:
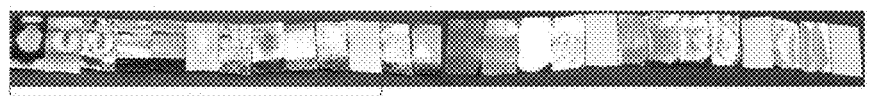
FIG. 6 is a photograph showing the state of layers after the combustion test.
Figure 7:
FIG. 7 is a photograph showing the state of layers after the combustion test.

FIGS. 6 and 7 are photographs showing the state after combustion test of layers of refractory insulating sheet Nos. 2 and 4 respectively.

The refractory insulating sheet of No. 2 differed from No. 1 in layered type thermal insulator. In the layered type thermal insulator used in No. 2, two graphite sheets were interposed on the heat source side. By interposing a graphite layer, the backside temperature after the combustion test could be lowered by 10° C., and the number of damaged layers due to combustion was reduced to 11 layers, as compared with No. 1. This superiority of No. 2 is supposed to be obtained due to the fact that the temperature rise of the whole laminate and the damaged layers of the layered type thermal insulator could be mitigated by the thermal conduction in the planar direction of the graphite layer against the local heating.

The refractory insulating sheet No. 3 contained an aerogel-carrying sheet instead of the graphite sheet interposed at a position (backside) away from the heat source than in the middle of the layered type thermal insulator. As compared with No. 1, the backside temperature of No. 3 were dropped by 20° C. or more, and showed excellent heat insulating effect. However, the number of damaged layers did not reduce regardless of thick refractory insulating sheet No. 2. This is supposed because the aerogel-carrying sheet was arranged in the 12th layer from the heat source, so that the reduction of the number of damaged layers could be limited or not exhibited.

In the refractory insulating sheet No. 4, a graphite sheet was placed as the outermost layer on the heat source side and an aerogel-carrying sheet in the middle part of the layered type thermal insulator. The temperature drop of No. 4 was smaller only by 3° C. than No. 1, and damaged layers was less than No. 1, despite of thicker than Nos. 1 and 2. The increase of damaged layers is supposed due to that graphite sheet was damaged because of its position closest to the heat source and could not sufficiently make the thermal energy conduct in planar direction. Moreover, a metal foil adjacent to the graphite sheet seemed to inhibit the thermal diffusion in the planar direction of the graphite sheet. For these reasons, the thermal diffusion effect in the planar direction by the graphite sheet was easily obtained in the case of the position in contact with the thermal energy consumption layer.

No. 5 has two graphite sheet-layers, one aerogel-layer, and two thermal energy consumption layers, and had a thickness corresponding to 70% of No. 1. No. 5 exhibited a temperature nearly equal to No. 1 at the backside. In addition, the number of damaged layers was less than No. 1. From this result, it is understood that the efficient reduction of the damaged layers as well as enhanced reduction of the temperature relative to thickness could be obtained by placing a reflector as the outermost layer of the heat source side, setting the layered unit "G/F" so that the graphite layer (G) was on the heat source side, and sandwiching a thermal

TABLE 1

| Sheet No. | | 1 | 2 | 3 | 4 | 5 |
|---|---|---|---|---|---|---|
| Layered type thermal insulator | Layer arrangement | MD/M/F/M/ MD/MD/M/F/M/ MD/MD/M/F/M/ MD/MD/M/F/M/MD | MD/M/G/G/F/ M/MD/MD/M/ F/M/MD/G/ MD/M/F/M/MD/ MD/M/F/M/MD | MD/M/F/M/MD/ MD/M/F/M/MD/ MD/A/MD/M/F/ M/MD/MD/A/ MD/M/F/M/MD | G/G/MD/M/F/ M/MD/MD/M/ F/M/MD/MD/A/ MD/M/F/M/MD/ MD/M/F/M/MD | MD/M/G/ F/M/MD/G/ MD/M/F/ M/MD/MD/A |
| | Thickness (mm) | 25.36 | 26.96 | 33.16 | 30.6 | 18.18 |
| | Weight(g) | 206.72 | 243.64 | 245.36 | 244.50 | 157.98 |
| Evaluation | Backside temperature (°.) | 73 | 63 | 50 | 70 | 73 |
| | Number of damaged layers (sheet) | 14 | 11 | 14 | 17 | 11 |

MD: Al-deposited fabric
M: Aluminum foil
F: Nonwoven fabric of silica-based fiber
G: Graphite sheet
A: Aerogel-carrying sheet energy consumption layer between the aerogel-carrying sheet and the graphite layer.

As shown in examples above, the refractory insulating sheet of the invention conducts thermal energy to spread the entire refractory insulating sheet even when locally heated, and can utilize the thermal energy for vaporization, thereby efficiently suppressing the temperature rise as well as the damage of the layered type thermal insulator due to the combustion regardless of thin and light weight refractory insulating sheet. Accordingly, the refractory insulating sheet of the invention is useful for fire insulation and heat insulation of the bundle of cables wired even a complicated site such as the corner portion. By appropriately designing the layer of the arrangement of the layered type thermal insulator in accordance with space and site to be applied, effective fire retardant can be achieved even the narrow or complicated place or site.

This application is based on Japanese Patent Application No. 2017-073375 filed on Apr. 3, 2017 in Japan, the contents of which hereby incorporated by reference.

What is claimed is:

1. A refractory insulating sheet comprising a layered type thermal insulator and a bag housing the layered type thermal insulator,
    wherein the bag is formed of woven fabric of refractory fibers;
    wherein the layered type thermal insulator comprises
        at least one thermal energy consumption layer (F) composed of a nonwoven fabric of silica-based inorganic fibers having a hydroxyl group;
        at least one reflector (R) which is a metal foil or a metal layer-attached substrate in which a metal layer overlays a substrate; and
        at least one graphite layer (G) in which graphite crystals are oriented in a planar direction.

2. The refractory insulating sheet according to claim 1, comprising a layered unit (G/F) in which the graphite layer is arranged on one side of the thermal energy consumption layer.

3. The refractory insulating sheet according to claim 1, comprising a layered unit (R/F/R) in which the thermal energy consumption layer is sandwiched between the reflectors.

4. The refractory insulating sheet according to claim 1, comprising a layered unit (R/G/F/R) in which first said reflector, the graphite layer, the thermal energy consumption layer, and second said reflector are arranged in this order.

5. The refractory insulating sheet according to claim 1, wherein at least one outermost surface of the layered type thermal insulator is the reflector.

6. The refractory insulating sheet according to claim 1, wherein the graphite layer is an expanded graphite sheet.

7. The refractory insulating sheet according to claim 1, wherein the metal layer-attached substrate is a metal-deposited cloth wherein the cloth is a woven fabric of glass fiber, silica fiber, ceramic fiber or mineral fiber, and the metal is deposited on the cloth.

8. The refractory insulating sheet according to claim 1, wherein one of the reflector is a layered unit (M/MD) in which the metal foil (M) overlays the metal layer-attached substrate (MD).

9. A refractory insulating sheet comprising a layered type thermal insulator and a bag housing the layered type thermal insulator,
    wherein the bag is formed of woven fabric of refractory fibers;
    wherein the layered type thermal insulator comprises
        at least one thermal energy consumption layer (F) composed of a nonwoven fabric of silica-based inorganic fibers having a hydroxyl group;
        at least one reflector (R) which is a metal foil or a metal layer-attached substrate in which a metal layer overlays a substrate;
        at least one graphite layer (G) in which graphite crystals are oriented in a planar direction; and
        at least one aerogel-carrying sheet (A) in which silica aerogel having a porosity of 70% or more is carried by a sheet-like fiber agglomerate.

10. The refractory insulating sheet according to claim 9, wherein at least one of the thermal energy consumption layers is placed between the graphite layer and the aerogel-carrying sheet.

11. The refractory insulating sheet according to claim 9, comprising a layered unit (R/F/R/A) in which first said reflector, the thermal energy consumption layer, second said reflector, and the aerogel-carrying sheet are arranged in this order.

12. The refractory insulating sheet according to claim 9, comprising a layered unit (R/G/F/R/A) in which first said reflector, the graphite layer, the thermal energy consumption layer, second said reflector, and the aerogel-carrying sheet are arranged in this order.

13. The refractory insulating sheet according to claim 9, wherein at least one outermost surface of the layered type thermal insulators is the reflector.

14. A refractory insulating sheet comprising a layered type thermal insulator and a bag housing the layered type thermal insulator,
    wherein the bag is formed of woven fabric of refractory fibers;
    wherein the layered type thermal insulator comprises
        at least one reflector (R) which is an aluminum foil or an aluminum layer-attached substrate in which a metal layer overlays a substrate, or a combination of the aluminum foil and the aluminum layer-attached substrate; and
        at least one thermal energy consumption layer (F) composed of a nonwoven fabric of silica-based inorganic fibers having a hydroxyl group, the thermal energy consumption layer being sandwiched between the reflectors.

* * * * *